United States Patent [19]

Kawabata et al.

[11] 4,212,476
[45] Jul. 15, 1980

[54] HYDRODYNAMIC SEAL

[75] Inventors: Hideo Kawabata, Fujisawa; Tatsuaki Yukimasa, Chigasaki, both of Japan

[73] Assignee: Nippon Oil Seal Industry Co., Ltd., Tokyo, Japan

[21] Appl. No.: 58,511

[22] Filed: Jul. 18, 1979

[30] Foreign Application Priority Data

Jul. 21, 1978 [JP] Japan .......................... 53-100343[U]

[51] Int. Cl.² .............................................. F16J 15/32
[52] U.S. Cl. .................................... 277/134; 277/152
[58] Field of Search ............... 277/152, 153, 157, 134, 277/203, 204

[56] References Cited

U.S. PATENT DOCUMENTS

| 2,932,535 | 4/1960 | Peickii et al. | 277/152 |
| 3,346,265 | 10/1967 | Rhoads et al. | 277/152 |
| 3,929,341 | 12/1975 | Clark | 277/134 |
| 4,119,324 | 10/1978 | Denton | 277/134 |
| 4,132,421 | 1/1979 | Corsi et al. | 277/134 |

Primary Examiner—Robert I. Smith
Attorney, Agent, or Firm—Holman & Stern

[57] ABSTRACT

Disclosed is a hydrodynamic seal comprising a sealing member of a fluorine resin including a sealing lip portion having a conical shape and a fixing portion extending from the sealing lip portion in the radial direction, a gripping support member for gripping and supporting the fixing portion of said sealing member and a coil spring member wound helically in the conical shape on the sealing lip portion of the sealing member, wherein a spiral projection is formed on the peripheral face of the sealing lip portion by the spring member.

4 Claims, 7 Drawing Figures

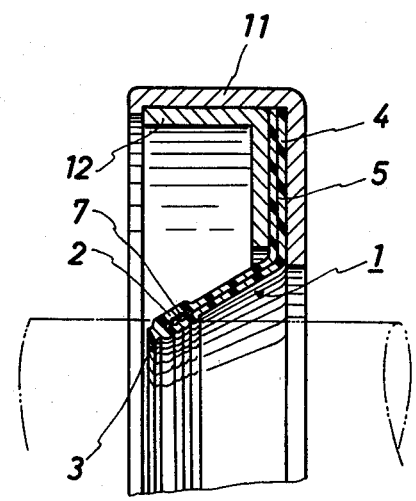
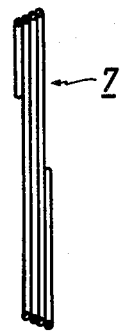
Fig. 1  Fig. 2
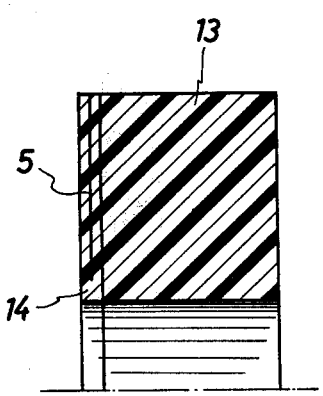
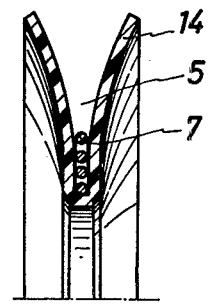
Fig. 3  Fig. 4

HYDRODYNAMIC SEAL

BACKGROUND OF THE INVENTION

1. Field of the Invention

The present invention relates to a hydrodynamic seal composed of a fluorine resin.

2. Description of the Prior Art

As the conventional seal composed of a fluorine resin, there is known a seal having a structure as shown in FIG. 7, which comprises a ring-shaped annular thin plate 20 composed of a fluorine resin, the outer peripheral portion 21 of said thin plate 20 being gripped and supported by an L-shaped outer ring 22 and an L-shaped inner ring 23 to bend the thin plate 20 substantially at the center thereof and a spring 27 being fitted in an annular recess 26 formed on the back face of a lip portion 25 formed on the inner peripheral portion 24 of said thin plate 20. In a conventional seal of this type, a good chemical resistance can be expected since the annular thin plate 20 per se is composed of a fluorine resin, but since the spring 27 is exposed to the outside, the spring 27 is promptly corroded and its function of imparting an elasticity to the lip portion is lost. In addition to this defect, this conventional seal involves a problem that processing for forming a screw groove on the lip portion is very difficult and the processing cost is increased.

SUMMARY OF THE INVENTION

It is a primary object of the present invention to provide a hydrodynamic seal excellent in the chemical resistance, the abrasion resistance and the good lubricating property.

Another object of the present invention is to a hydrodynamic seal in which a good sealing effect can be attained by a spiral projection formed on the circumferential face of the sealing lip portion.

Still another object of the present invention is to provide a hydrodynamic seal comprising a coil spring member wound helically in the conical form on the sealing lip portion of a sealing member.

BRIEF DESCRIPTION OF THE DRAWINGS

FIG. 1 is a sectional view illustrating one embodiment of the hydrodynamic seal of the present invention.

FIG. 2 is a sectional view illustrating a coil spring member to be wound helically in the hydrodynamic seal shown in FIG. 1, which is in the free state.

FIGS. 3 through 6 are views showing the steps of the process for the preparation of the hydrodynamic seal of the present invention.

DETAILED DESCRIPTION OF THE PREFERRED EMBODIMENTS

Figure 5:
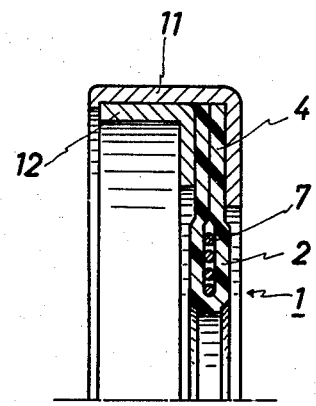

The hydrodynamic seal of the present invention comprises a sealing member including a sealing lip portion formed of a fluorine resin material such as polytetrafluoroethylene and having conical faces on both the outer and inner peripheries thereof, which forms a seal lip on the top end thereof, and a plate-like fixing portion which is connected to the sealing lip portion and extended therefrom outwardly in the radial direction, outer and inner rings composed of a material having a rigidity such as a metallic material, said outer and inner rings cooperatively gripping said plate-like fixing portion to support the sealing member, and a spring member formed of a spring wire material and helically wound in the conical form, said spring member being included in the sealing lip portion of said sealing member, wherein a rising spiral projection is formed on the inner peripheral face of said sealing lip portion by the winding wire of said spring member and said outer ring is mounted on a housing through which a rotation shaft is pierced, so that the sealing lip portion falls in contact with the peripheral face of the rotation shaft, whereby a lubricant lubricating the bearing portion is prevented from leaking by the screw action (hydrodynamic action) caused by the spiral projection with rotation of the rotation shaft.

The structure of the hydrodynamic seal of the present invention will now be described by reference to the accompanying drawings.

As shown in FIG. 1, a sealing member 1 composed of a fluorine resin includes a sealing lip portion 2 having inner and outer peripheral faces having a conical form and a seal lip 3 formed on the top end on the small diameter side, and a plate-like fixing portion 4 connected to the sealing lip portion 2 and extended therefrom outwardly in the radial direction. As shown in FIG. 2, a coil spring member 7 composed of an elastic wire material and helically wound in the shape of a frustum cone is included in the sealing lip portion 2. A gripping and supporting member includes outer and inner rings 11 and 12 having an L-shaped form including axial and radial direction portions, and the axial direction portions of the outer and inner rings 11 and 12 are engaged and combined with each other, and the plate-like fixing portion 4 of the sealing member 1 is gripped and held by the radial direction portions of the outer and inner rings 11 and 12. The sealing member 1 is combined and integrated with the coil spring member 7 and outer and inner rings 11 and 12 in the following manner.

Both the inner and outer peripheral faces of the sealing member 1 are formed to have a shape of a frustum cone and a cut 5 is formed in an intermediate portion between both the peripheral faces to extend from the large diameter side to the point close to the edge on the small diameter side. This sealing member 1 is compressed by a mold to deform the large diamater side to have a plate-like shape, and a coil spring member 7 preliminarily wound in the spiral form is inserted into the cut 5. Then, the plate-like large diameter portion of the sealing member 1 is gripped by radial direction portions of outer and inner rings 11 and 12 preliminarily bent to have an L-shaped section, axial direction portions of which are combined and engaged with each other. Thus the coil spring member 7 is included in the sealing lip portion 2 and the sealing member 1 is held by the outer ring 11. The coil spring member 7 is formed of an elastic wire material having an appropriate diameter, and the wire material is wound at such a pitch that every adjacent lines are brought into close contact with each other or an appropriate space is formed between every two adjacent lines. A screw-like projection having an appropriate pitch is formed on the peripheral face of the sealing lip portion 2 by embedding this coil spring member 7 in the sealing member 1. Each of the outer and inner rings 11 and 12 is formed of a metal plate, a synthetic resin material or a combination thereof.

In the hydrodynamic seal having the above-mentioned stucture, the outer ring 11 is inserted into a housing through which a rotation shaft is pierced, and the rotation shaft indicated by a chain line in FIG. 1 is inserted into an insertion hole of the sealing lip portion 2 to press the sealing lip portion 2 to the peripheral face of the rotation shaft, whereby a sealing action is given to a lubricant at a bearing portion.

An embodiment of the process for the preparation of the hydrodynamic seal of the present invention will now be described by reference to FIGS. 3 through 6.

Figure 6:
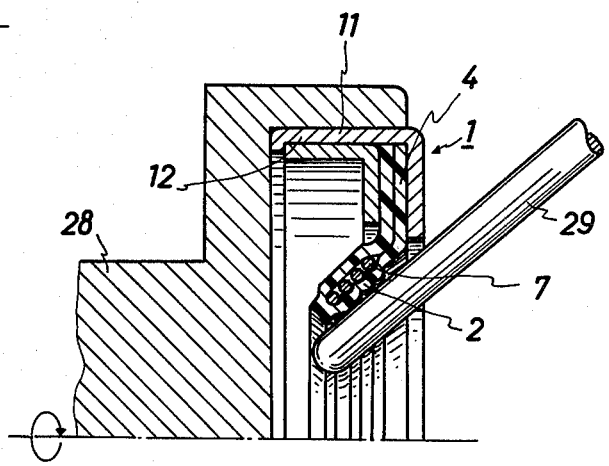
Figure 7:
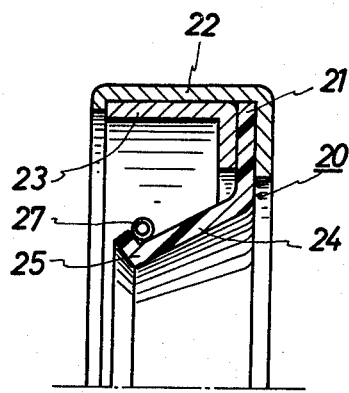
FIG. 7 is a sectional view illustrating a conventional seal.

As shown in FIG. 3, a ring-shaped annular thin plate 14 having a cut 5 is cut from a hollow cylindrical fluorine resin material 13. Then, as shown in FIG. 4, a spring member 7 helically wound, which has a disc-like shape in the free state, is arranged in the cut 5 of the thin plate 14. The fixing portion 4 on the outer peripheral side of the thin plate 14 in which the spring member 7 is thus arranged is gripped and supported by a gripping support member including outer and inner rings 11 and 12 having an L-shaped section as shown in FIG. 5. As shown in FIG. 6, this sealing member 1 is fitted on a rotation fixing member 28. While this sealing member 1 is being rotated, a rod member 29 composed of a fluorine resin is pressed against the sealing lip portion of the sealing member so that the quantity of deformation is gradually increased, whereby the sealing lip portion 2 is deformed to have a conical shape. At this time, also the spring member 7, which has a disc-like shape in the free state, is caused to have a conical shape as well as the sealing lip portion 2.

By virtue of the above-mentioned characteristic feature of the hydrodynamic seal of the present invention, the following effects can be attained.

Since the sealing member is composed of a fluorine resin material and the coil spring member is completely embedded in this sealing member, a high acid resistance and a high chemical resistance are ensured. Furthermore, by embedding the coil spring memer, a screw-like projection is formed on the peripheral face of a sealing member, whereby a high sealing effect can be obtained. Moreover, since the coil spring member helically wound in the conical form is included in the sealing lip portion of the sealing member, a good elasticity is given to the lip portion, and since a spiral projection is formed on the peripheral face of the sealing lip portion, the molding can be performed very easily and the manufacturing cost can be remarkably reduced. Incidentally, formation of this spiral projection on the peripheral face of the sealing lip portion can be accomplished assuredly by the step of pressing the sealing lip portion as shown in FIG. 6.

In the foregoing embodiment, an inner seal is illustrated. The present invention may be applied to an outer seal by customary modifications obvious to those skilled in the art.

What is claimed is:

1. A hydrodynamic seal comprising a sealing member of a fluorine resin including a sealing lip portion having a conical shape and a fixing portion extending from the sealing lip portion in the radial direction, a gripping support member for gripping and supporting said fixing portion of said sealing member and a coil spring member wound helically in the conical shape on said sealing lip portion of said sealing member, wherein a spiral projection is formed on the peripheral face of said sealing lip portion by said spring member.

2. A hydrodynamic seal as set forth in claim 1 wherein said spring member is arranged in said sealing member through a cut formed on said sealing member.

3. A hydrodynamic seal as set forth in claim 1 wherein said spring member is helically wound so that it has a conical shape in the free state.

4. A hydrodynamic seal as set forth in claim 1 wherein said spring member is helically wound so that it has a disc-like shape in the free state.

* * * * *